(12) United States Patent
Shecterle et al.

(10) Patent No.: US 8,313,563 B2
(45) Date of Patent: Nov. 20, 2012

(54) APPARATUS AND PROCESS FOR ISOMERIZING A HYDROCARBON STREAM

(75) Inventors: David J. Shecterle, Arlington Heights, IL (US); Bryan S. Garney, Crystal Lake, IL (US); James M. Shawley, Clarkston, WA (US); Jocelyn Daguio, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 13/229,190

(22) Filed: Sep. 9, 2011

(65) Prior Publication Data
US 2011/0315166 A1    Dec. 29, 2011

Related U.S. Application Data

(62) Division of application No. 12/485,259, filed on Jun. 16, 2009.

(51) Int. Cl.
*B08B 9/08*    (2006.01)

(52) U.S. Cl. ............... 95/121; 95/117; 95/123; 95/126; 95/148; 208/133; 96/108; 96/150

(58) Field of Classification Search .......... 208/133–141, 208/187–188; 95/90, 117, 121, 123, 126, 95/148; 96/108, 150
See application file for complete search history.

(56) References Cited

U.S. PATENT DOCUMENTS 5,264,187 A * 11/1993 Olbrich et al. ................ 422/612
* cited by examiner

*Primary Examiner* — Brian McCaig
(74) *Attorney, Agent, or Firm* — Maryann Maas

(57) ABSTRACT

One exemplary embodiment can be an apparatus for isomerizing a hydrocarbon stream rich in a C4 hydrocarbon and/or at least one of a C5 and C6 hydrocarbon. The apparatus can include: a vessel containing a fluid including at least one reactant; a fluid transfer device receiving the fluid including at least one reactant from the vessel; at least one drier receiving the fluid including at least one reactant from the fluid transfer device; and a reactor communicating with the at least one drier to receive the fluid including at least one reactant. In addition, the at least one drier may communicate with the vessel at least by sending the fluid including at least one reactant or the regenerant through a fluid tapering device for at least one of regulating the flow and reducing the pressure of the regenerant to the vessel.

6 Claims, 4 Drawing Sheets

US 8,313,563 B2

APPARATUS AND PROCESS FOR ISOMERIZING A HYDROCARBON STREAM

CROSS REFERENCE TO RELATED APPLICATION

This application is a Division of copending application Ser. No. 12/485,259 filed on Jun. 16, 2009, the contents of which are hereby incorporated by reference in its entirety.

FIELD OF THE INVENTION

The field of this invention generally relates to an apparatus and a process for isomerizing a hydrocarbon stream.

DESCRIPTION OF THE RELATED ART

Isomerization of light paraffins is often conducted to increase the octane content of gasoline. Generally, such isomerization processes are conducted on separate light hydrocarbon fractions. As an example, isomerization of butane, or pentane and/or hexane (hereinafter may be abbreviated pentane-hexane) is undertaken in separate isomerization units to improve the gasoline quality. Typically, both the isomerization of butane or pentane-hexane are conducted in a fixed-bed liquid/vapor phase or vapor phase process. The reactor can receive a feed of the light paraffins mixed with a gas including a substantial amount of hydrogen.

In the isomerization of butane or pentane-hexane, water is a poison that can reduce the life expectancy of the reactor catalyst. As such, it is desirable to remove water before the hydrogen rich gas and/or the paraffin feed reaches the reactor. Consequently, typically both the feed and the gas are passed through separate drier units to remove water.

Often, two driers are utilized in either series or parallel with alternating regeneration operations, whether the fluid being processed is a hydrocarbon containing butane or pentane-hexane or a gas rich in hydrogen. As such, one drier can be in operation while the other drier may be regenerating. At the end of the regeneration, the drier may contain a liquid regenerant if the drier is a hydrocarbon feed drier, or a gas regenerant if the drier is a gas drier. Depending on the hydrocarbon fraction being isomerized, the regenerant can include mostly an isomerized product, such as isobutane, or at least one of isopentane and methylpentane or dimethylbutane (hereinafter may be referred to as isopentane-isohexane) or the regenerant can include a mixture of one or more different branched, normal, and cyclic compounds. In either instance, generally the regenerant is flushed out of the drier before or as the regenerated drier enters into service. The regenerant is often passed to the reactor.

The regenerant, whether liquid or gas, can cause upsets in the downstream vessels. Particularly, the gas regenerant can cause a drop in reaction temperatures as the regenerant replaces the hydrogen used in the reactor, and disrupts the hydrogen:hydrocarbon mole ratio in the reactor. Also, a liquid regenerant can cause a drop in reactor temperatures by replacing a reactant, namely the paraffinic hydrocarbon feed. In addition, generally the gas regenerant has a heavier molecular weight than the hydrogen rich gas. As a consequence, replacing the hydrogen rich gas may upset the gas flow controls, such as the make-up gas flow, as well as disturbing the pressure controls in a distillation column, that is typically used downstream of the reactor. Thus, there is a desire to lessen the impact after the regeneration of either the gas or feed drier to prevent upsets of downstream vessels.

SUMMARY OF THE INVENTION

One exemplary embodiment can be an apparatus for isomerizing a hydrocarbon stream rich in a C4 hydrocarbon and/or at least one of a C5 and C6 hydrocarbon. The apparatus can include: a vessel containing a fluid including at least one reactant; a fluid transfer device receiving the fluid including at least one reactant from the vessel; at least one drier receiving the fluid including at least one reactant from the fluid transfer device; and a reactor communicating with the at least one drier to receive the fluid including at least one reactant. In addition, the at least one drier may communicate with the vessel at least by sending the fluid including at least one reactant or the regenerant through a fluid tapering device. The fluid tapering device may perform at least one of regulating the flow and reducing the pressure of the regenerant to the vessel. The at least one drier can operate at a first condition to dry the fluid including at least one reactant and at a second condition during regeneration with a regenerant.

Another exemplary embodiment can be a process for regenerating at least one drier for an apparatus for isomerizing a hydrocarbon stream rich in a C4 hydrocarbon and/or rich in at least one of a C5 and C6 hydrocarbon. The process can include: regenerating the at least one drier with a regenerant wherein the at least one drier contains a used regenerant; and recycling the used regenerant upstream of the at least one drier to mix over a period of time sufficient to dilute the used regenerant with a fluid including at least one reactant to be dried to minimize upsets in one or more downstream operations.

Yet another exemplary embodiment can be a process for regenerating at least one drying zone for an apparatus isomerizing a hydrocarbon stream. The process can include: recycling a used regenerant rich in a C4 hydrocarbon and/or at least one of a C5 and C6 hydrocarbon upstream of the at least one drying zone to mix over a period of time sufficient to dilute the used regenerant with a fluid including at least one reactant to be dried for minimizing upsets in one or more downstream operations.

Therefore, the embodiments disclosed herein can minimize upsets in operations downstream of a fluid drying zone by recycling a used regenerant upstream of the drying zone. The used regenerant may be passed through a fluid tapering device to permit dilution of the used regenerant with an incoming fluid to be dried.

DEFINITIONS

As used herein, the term "stream" can be a stream including various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the hydrocarbon molecule. In addition, the term "Cn-Cn+1 hydrocarbon," such as "C5-C6 hydrocarbon," can mean at least one of a C5 and C6 hydrocarbon.

As used herein, the term "zone" can refer to an area including one or more equipment items and/or one or more sub-zones. Equipment items can include one or more reactors or reactor vessels, heaters, separators, exchangers, pipes, pumps, compressors, and controllers. Additionally, an equipment item, such as a reactor, drier or vessel, can further include one or more zones or sub-zones. It should be understood that each zone can include more equipment and/or vessels than depicted in the drawings.

As used herein, the term "fluid tapering device" generally means a device that at least directly or indirectly regulates the flow or reduces the pressure of a fluid. Generally, a fluid tapering device reduces a fluid flow as compared to its absence in e.g., a line, and may throttle a flow of fluid, as opposed to isolating the fluid. An exemplary fluid tapering device can include a restriction orifice or a controller such as a pressure differential indicating controller, a pressure indicating controller, a flow indicating controller, a flow indicator or a pressure indicator, typically acting in concert with one or more other devices, such as a control valve or a restriction orifice. Exemplary fluid tapering devices can include a combination of two or more components such as a restriction orifice, a flow indicator, a pressure differential indicating controller, and a control valve; or a flow indicating controller and a control valve acting in concert. The fluid tapering device can be installed on one or more lines to alter fluid flow or reduce pressure.

As used herein, the term "fluid transfer device" generally refers to a device for transporting a fluid. Such devices include pumps typically for liquids, and compressors typically for gases.

As used herein, the term "rich" can mean an amount generally of at least about 50%, and preferably about 70%, by mole, of a compound or class of compounds in a stream.

As used herein, the term "substantially" can mean an amount generally of at least about 90%, preferably about 95%, and optimally about 99%, by mole, of a compound or class of compounds in a stream.

As used herein, the term "absorption" can refer to the retention of a material in a bed containing an absorbent and/or adsorbent by any chemical or physical interaction between a material, such as water, and the bed, and includes, but is not limited to, adsorption, and/or absorption. The removal of the material from an absorbent may be referred to herein as "desorption."

As used herein, the term "used regenerant" can refer to a regenerant that has been used for drying or desorbing, or that has been circulated through one or more vessels or equipment items, such as a drier. A used regenerant may or may not have desorbed a material, such as water, but may be present in a vessel after the vessel contents, such as a molecular sieve, have been regenerated.

As used herein, the term "coupled" can mean two items, directly or indirectly, joined, fastened, associated, connected, or formed integrally together either by chemical or mechanical means, by processes including stamping, molding, or welding. What is more, two items can be coupled by the use of a third component such as a mechanical fastener, e.g. a screw, a nail, a staple, or a rivet; an adhesive; or a solder.

DETAILED DESCRIPTION

Figure 1:
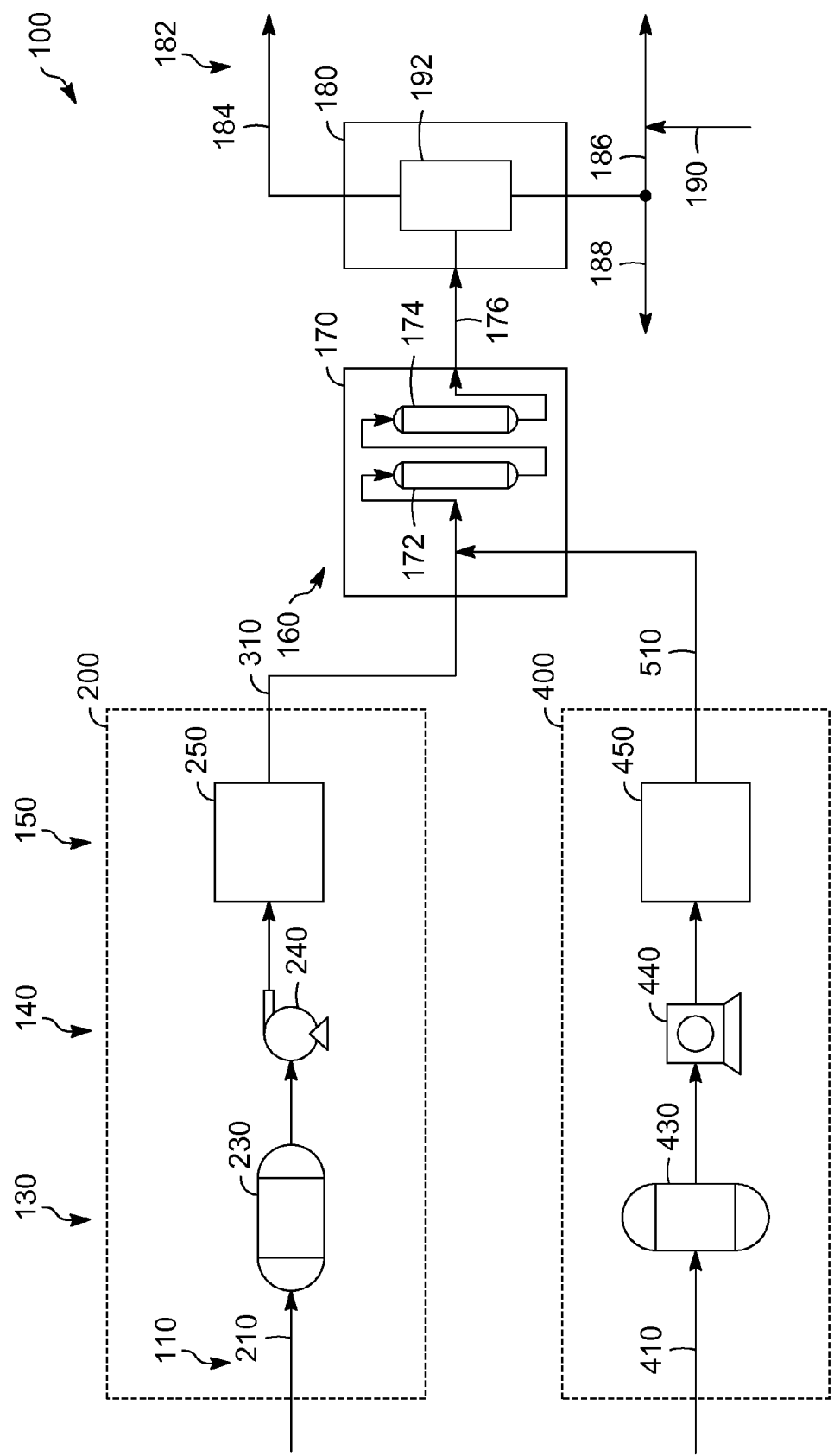
FIG. 1 is a schematic depiction of an exemplary apparatus for isomerizing a fluid.

An apparatus 100 for isomerizing a hydrocarbon stream is depicted in FIG. 1. Generally, the apparatus 100 can receive a fluid including at least one reactant 110 in either a line 210 or a line 410. Usually, the fluid 110 can be a liquid hydrocarbon stream in the line 210 or a gas rich in hydrogen in the line 410. The liquid hydrocarbon stream can be rich in a C4 hydrocarbon, such as butane, if the apparatus 100 is a C4 isomerization apparatus. Alternatively, the liquid hydrocarbon stream can be rich in a C5-C6 hydrocarbon, such as pentane-hexane, if the apparatus 100 is a C5-C6 isomerization apparatus. Exemplary apparatuses of both types are disclosed in, e.g., Nelson A. Cusher, *UOP Butamer Process* and *UOP Penex Process* of the Handbook of Petroleum Refining Processes, Third Edition, Robert A. Meyers, Editor, 2004, pp. 9.7-9.27. However, the apparatus 100 may also be utilized for simultaneously isomerizing a stream of one or more butanes, one or more pentanes, and one or more hexanes in some exemplary embodiments. Note that the isomerization reactions include those having largely normal paraffins as feedstock and branched paraffins as isomerate product as well as those having largely branched paraffins as feedstock and normal paraffins as isomerate product. In other words, the liquid hydrocarbon stream can be rich in isobutane or branched C5-C6 hydrocarbon. Other isomerization reactions involving the C4 or C5-C6 hydrocarbons are within the scope of the invention as well.

To simplify the discussion below, terms such as "liquid hydrocarbon" and "regenerant" may be referred to generically and should be understood to be applicable to, e.g., either a C4 isomerization apparatus or a C5-C6 isomerization apparatus. As an example, a hydrocarbon stream rich in a C4 hydrocarbon can be isomerized in a C4 isomerization reactor and an isomerized C4 hydrocarbon product can be used as a regenerant in a C4 isomerization apparatus. Likewise, a hydrocarbon stream rich in a C5-C6 hydrocarbon can be isomerized in a C5-C6 isomerization reactor, and an isomerized C5-C6 hydrocarbon product can be used as a regenerant in a C5-C6 isomerization apparatus.

The apparatus 100 can include one or more vessels 130, one or more fluid transfer devices 140, one or more drying zones 150, and one or more downstream vessels 160. The one or more vessels 130 can include a surge drum 230 or a distillation column receiver 230 (may be hereinafter referred to collectively as a surge drum 230) for receiving a hydrocarbon stream and a suction drum 430 for receiving a gas rich in hydrogen, such as a recycled hydrogen gas stream.

The one or more fluid transfer devices 140 can include a pump 240 for receiving the hydrocarbon stream from the surge drum 230, and a compressor 440 for receiving the gas rich in hydrogen from the suction drum 430. The one or more drying zones 150 can include a liquid drying zone 250 for receiving the liquid hydrocarbon stream from the pump 240, and a gas drying zone 450 for receiving the gas rich in hydrogen from the compressor 440.

Generally, the surge drum 230, the pump 240, and the liquid drying zone 250 are comprised in a first fluid drying unit 200. Generally, the liquid hydrocarbon stream is provided by the line 210 and exits via a line 310. Also, the suction drum 430, the compressor 440, and the gas drying zone 450 are comprised in a second fluid drying unit 400. Generally, a gas is provided in the line 410 and exits via a line 510. Both units 200 and 400 are discussed in further detail below.

The one or more downstream vessels 160 can be segregated into a reaction zone 170 and a fractionation zone 180 where one or more downstream operations can occur. After exiting the drying zones 250 and 450, the hydrocarbon stream and the gas rich in hydrogen may be combined in the reaction zone 170. The reaction zone 170 can include a first reactor 172 and a second reactor 174 in series with the first reactor 172.

Although only the first reactor 172 and second reactor 174 are depicted, it should be understood that the reaction zone 170 can further include other vessels and/or equipment, such as one or more heaters, a recycle gas compressor, a separator vessel, and additional reactors. Alternatively, the reactors 172 and 174 can be placed in single operation. The effluent from the reaction zone 170 can exit a line 176 to the fractionation zone 180.

The fractionation zone 180 can include a distillation column 192 producing one or more separated products 182. Although one distillation column 192 is depicted, two or more distillation columns may be operated in series and/or in parallel. The one or more separated products 182 may include a first product of one or more gases routed to e.g., fuel gas, in a line 184 and a second product or isomerized product in a line 186. A portion of the second product can be withdrawn through a line 188 and used as a regenerant. Used regenerant can be returned to the isomerized product in a line 190, as hereinafter described. The combined stream can be sent to an isomerized product storage tank, a distillation column, or another process unit.

Referring to FIG. 2, the first fluid drying unit 200 is depicted. The first fluid drying unit 200 can be used to dry a liquid hydrocarbon stream, typically a light normal paraffin stream. Usually, the first fluid drying unit 200 includes the surge drum 230, the pump 240, at least one drier 254, one or more valves 260, a fluid tapering device 290, and a heater 300.

Preferably, the at least one drier 254 includes a first liquid drier 256 and a second liquid drier 258. The drier 256 and the drier 258 can be comprised in the liquid drying zone 250 as depicted in FIG. 1. Moreover, each drier 256 and 258 can contain a molecular sieve where absorption of water occurs and a respective internal drying zone or sub-zone. Generally, each drier 256 and 258 operates at a first condition to dry the hydrocarbon stream passing through the drier and a second condition to regenerate the drier. Typically, the driers 256 and 258 are in series and regenerate alternatively with the other drier drying.

The one or more valves 260 can include a valve 262, a valve 264, a valve 264', a valve 266, a valve 268, a valve 270, a valve 270', a valve 272, a valve 274, a valve 276, a valve 278, a valve 280, a valve 282, and a valve 284. Various combinations of valves 260 can be opened and closed to direct process streams for conducting the first and second conditions.

In this exemplary embodiment, the fluid tapering device 290 can include a flow indicating controller 292 communicating with a control valve 294, and can regulate the flow and reduce the pressure of the regenerant. The heater 300 can include a steam heater 304 and a superheater 308 for heating the regenerant to operate at the second condition for regenerating a drier. Particularly, the steam heater 304 can be used to vaporize the regenerant before the superheater 308 brings the regenerant to a sufficient temperature to desorb water from the molecular sieve of the drier 256 or 258.

In one exemplary regeneration operation, the liquid hydrocarbon stream can be passed through the line 210 into the surge drum 230. Afterwards, the liquid hydrocarbon stream may pass to the pump 240 and then to the first drier 256 or the second drier 258. Generally, the liquid hydrocarbon stream enters one of the driers, as an example, the drier 258, and passes through the valves 278 and 280 and into the drier 258 to have water removed. Afterwards, the dry liquid hydrocarbon stream can pass through the valves 272 and 268 and into the line 310 to the reaction zone 170 as depicted in FIG. 1. Typically, the liquid hydrocarbon stream is being dried in the drier 258 with the valves 266, 270, 270' and 276 closed, while the valves 278, 280, 268 and 272 are open.

Meanwhile, the other drier 256 can be regenerated. Generally, the regeneration is a multiple stage process using a liquid regenerant from the line 188 of FIG. 1, which may be passed to the heater 300. During the regeneration, the regenerant may be heated in stages with the steam heater 304 and then with both the steam heater 304 and the superheater 308 until the regenerant can be of sufficient temperature to desorb the water from the molecular sieve. Generally, the regenerant passes through the steam heater 304 and the superheater 308 through a line 288 and the valve 282 to the top of the drier 256. Subsequently, the regenerant can pass through the drier 256, and through the valve 284 and a line 298 before being cooled with e.g., a cooling water exchanger. Next, the regenerant can be routed via the line 190 to isomerized product as depicted in FIG. 1.

Afterwards, the regenerant is slowly cooled by first turning off the superheater 308 and then the steam heater 304 while continually passing the regenerant through the drier 256. Thus, the drier 256 and associated equipment can be cooled in stages to slowly ramp down the temperatures. At the end of the regeneration process, the drier 256 generally contains the liquid regenerant.

Figure 2A:
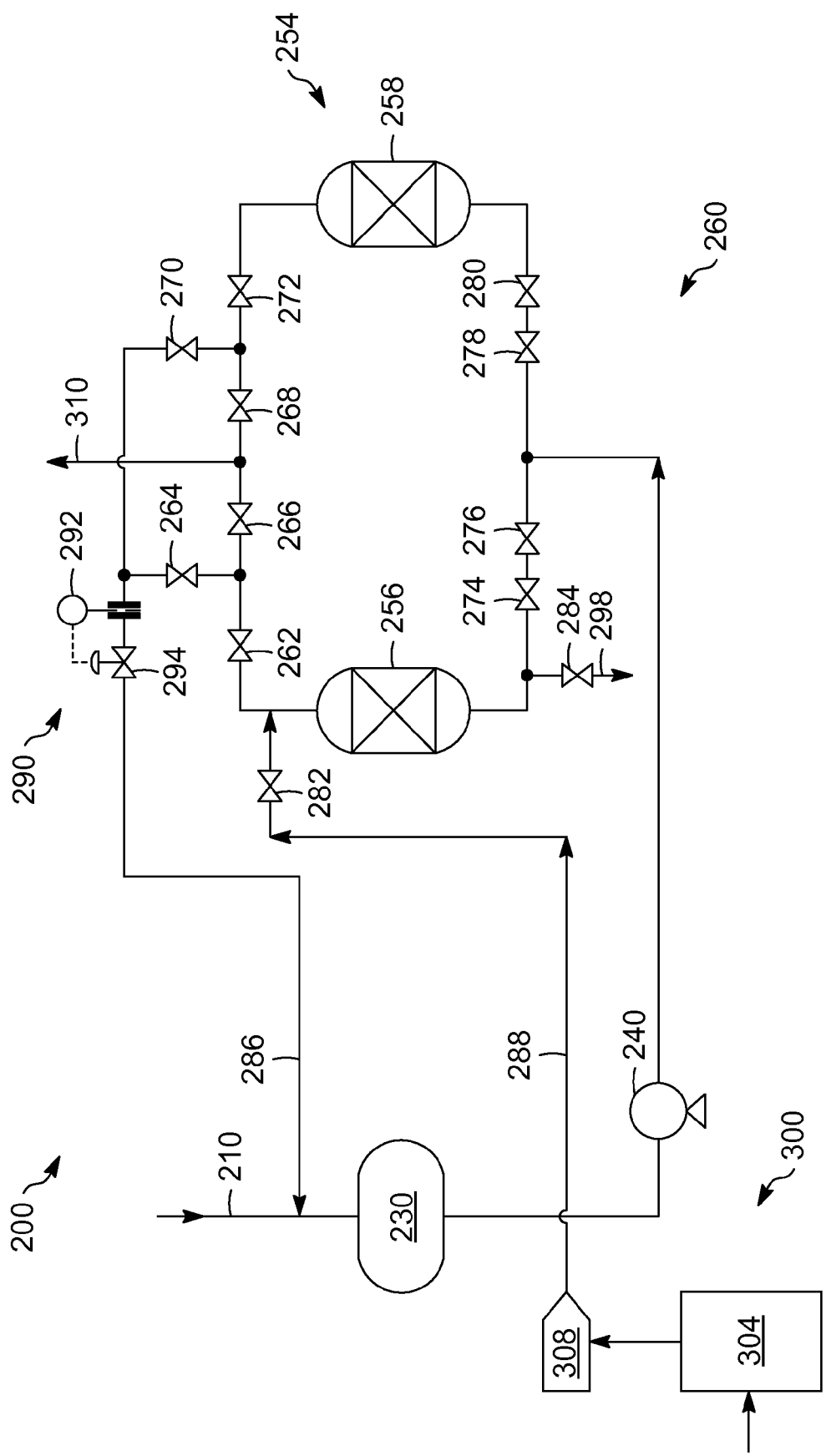
FIG. 2A is a schematic depiction of an exemplary first fluid drying unit.
Figure 2B:
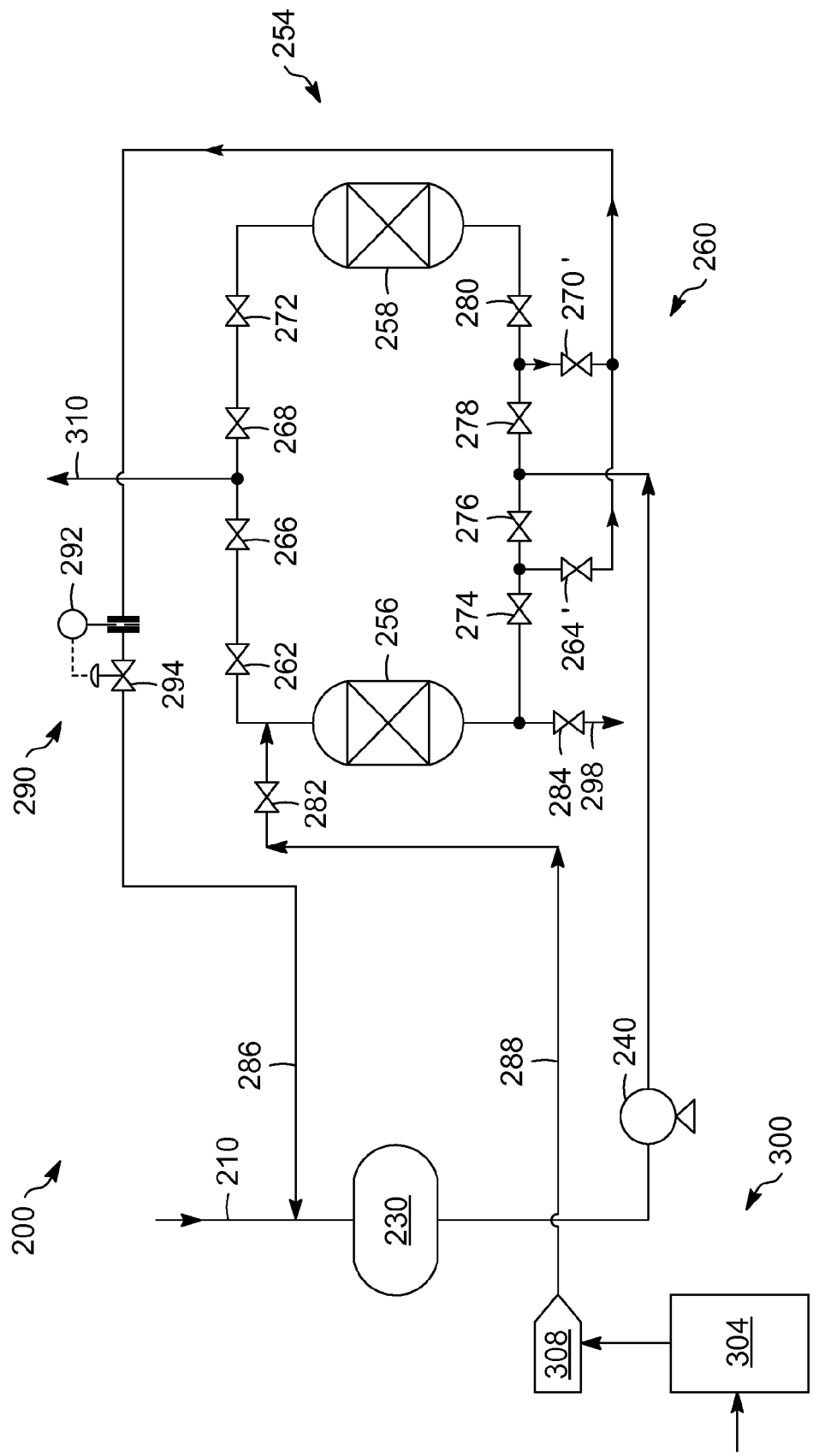
FIG. 2B is a schematic depiction of an exemplary second fluid drying unit.

By using the liquid hydrocarbon stream, the used regenerant can be forced upflow from the drier 256 through the opened valves 262 and 264 to a line 286 as depicted in FIG. 2A. Alternatively, by using the liquid hydrocarbon stream, the used regenerant can be forced downflow from the drier 256 through the opened valves 274 and 264' to a line 286 as depicted in FIG. 2B. The liquid used regenerant may pass through a flow indicating controller 292 communicating with a control valve 294. Generally, the control valve 294 regulates the flow of the liquid back to or upstream of the surge drum 230. As the used regenerant passes through the control valve 294, the pressure of the fluid may drop to permit its passage into the surge drum 230. Typically, there is a large pressure difference of the used regenerant upstream of the control valve 294 and the surge drum 230. Using the control valve 294 to reduce the pressure of the used regenerant can prevent a "blow-out" of the surge drum 230. Usually, it is desired to not only regulate the flow of the used regenerant, but also to reduce its pressure. Regulating the return of the used regenerant to the surge drum 230 can mix and dilute the used regenerant with the incoming fluid in the line 210 to reduce the impact on downstream equipment, operations and/or vessels, such as those vessels 160 comprised in the reaction zone 170 and the fractionation zone 180 as depicted in FIG. 1. Although a flow indicating controller and a control valve have been disclosed, it should be understood that other types of fluid tapering devices may be used, such as a restriction orifice or other type of device. Furthermore, during the passage of the used regenerant back to the surge drum 230, a period of time can be calculated for the desired dilution of the regenerant. The flow controller 292 can be adjusted to increase or decrease the flow of the regenerant through the control valve 294. Generally, the presence of the fluid tapering device 290, such as the control valve 294, can reduce the amount of liquid flowing back to the surge drum 230 than otherwise would occur in its absence.

As discussed above, the drier 258 may be operated at the first condition and the other drier 256 can be operated at the second condition. It should be understood that FIG. 2A and FIG. 2B are merely schematics and additional lines and/or valves can be provided to operate the drier 256 at the first condition, the drier 258 at the second condition, and both driers in series. As an example, the driers 256 and 258 can be placed back in series operation with, e.g., the drier 256 in a lag position with respect to the drier 258, after regeneration.

Figure 3:
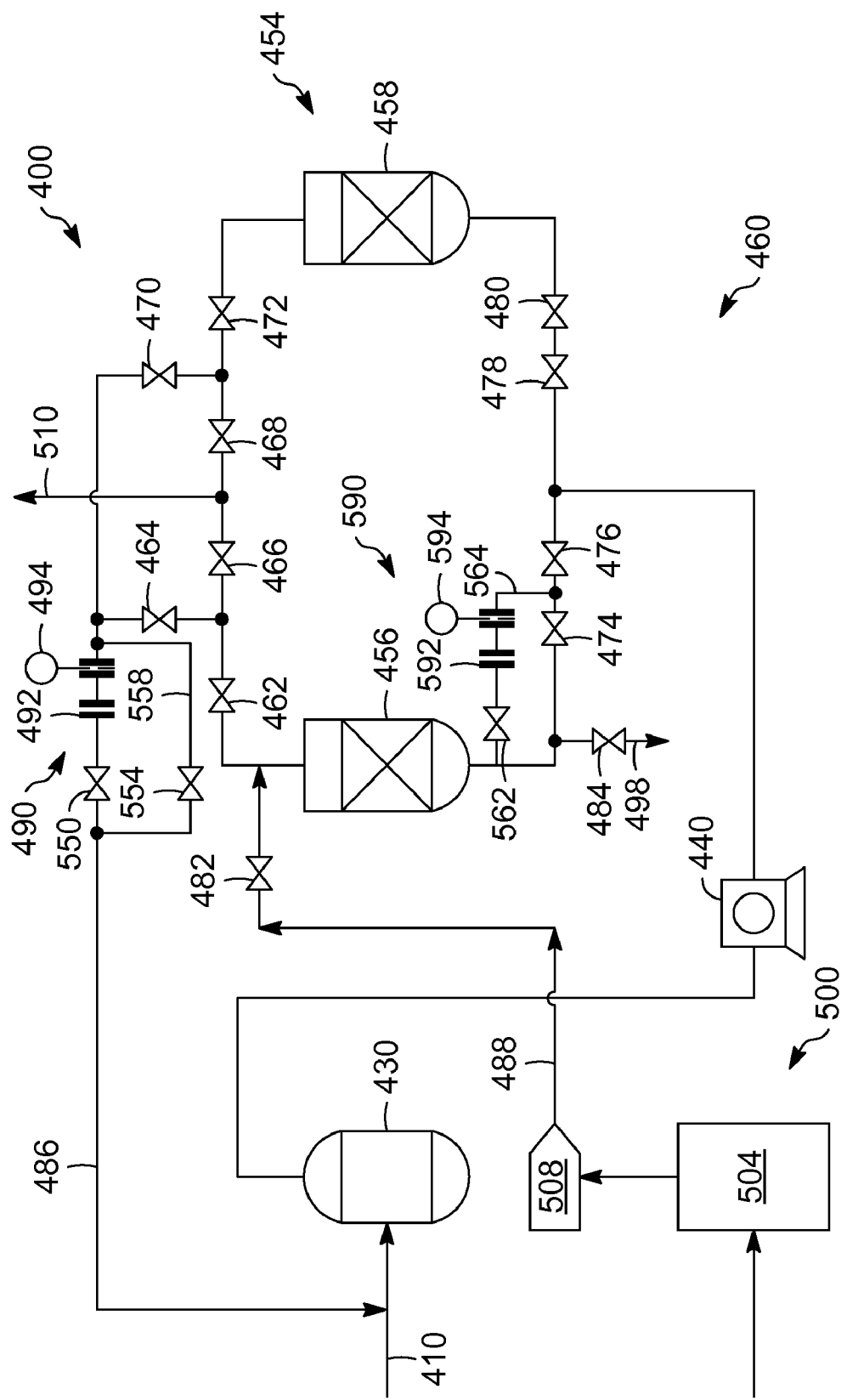
FIG. 3 is a schematic depiction of an exemplary third fluid drying unit.

Referring to FIG. 3, the second fluid drying unit 400 is depicted. The second fluid drying unit 400 can be used to dry a gas stream, such as a gas rich in hydrogen. Usually, the second fluid drying unit 400 includes the suction drum 430, the compressor 440, at least one drier 454, one or more valves 460, a fluid tapering device 490, and a heater 500. The second fluid drying unit 400 may also include another fluid tapering device 590, which may be used in the alternative as described hereinafter.

Preferably, at least one drier 454 includes a first gas drier 456 and a second gas drier 458. The drier 456 and the drier 458 can be comprised in the gas drying zone 450 depicted in FIG. 1. Moreover, each drier 456 and 458 can contain a molecular sieve where absorption of water occurs and include a respective internal drying zone or sub-zone. Generally, each drier 456 and 458 operates at a first condition to dry the gas rich in hydrogen passing through the drier 456 or 458 and a second condition to regenerate the drier 456 or 458. Typically, the driers 456 and 458 are in series and regenerate alternatively with the other drier drying.

The one or more valves 460 can include a valve 462, a valve 464, a valve 466, a valve 468, a valve 470, a valve 472, a valve 474, a valve 476, a valve 478, a valve 480, valve 482, a valve 484, a valve 550, a valve 554, and a valve 562. Various combinations of valves 460 can be opened and closed to direct process streams for conducting the first and second conditions.

In this exemplary embodiment, the fluid tapering device 490 can include a restriction orifice 492 and a flow indicator 494, and can reduce the flow and reduce the pressure of the regenerant. The heater 500 can include a steam heater 504 and a superheater 508 for heating the regenerant to operate in the second condition for regenerating a drier. Particularly, the steam heater 504 can be used to vaporize the regenerant before the superheater 508 brings the regenerant to a sufficient temperature to remove water from the molecular sieve of the drier 456 or 458.

In one exemplary regeneration operation, the gas, such as a gas rich in hydrogen, can enter through the line 410 to the suction drum 430. The gas can then pass to the compressor 440, and then to one of the driers 456 and 458. As an example, the gas can enter through the valves 478 and 480 into the drier 458 to desorb water. Afterwards, the dry gas can pass through valves 472 and 468 into a line 510 to be combined with the liquid hydrocarbon stream before entering the reaction zone 170 as depicted in FIG. 1. Typically, the gas stream is dried in the drier 458 with the valves 466, 470, 474 and 476 are closed, while the valves 478, 480, 468, and 472 are open.

Meanwhile, the other drier 456 can be regenerated. Generally, the regeneration is a multiple stage process using a liquid regenerant from the line 188 of FIG. 1, which may be passed to the heater 500. During the regeneration, the regenerant may be heated in stages with the steam heater 504 and then with both the steam heater 504 and the superheater 508 until the regenerant is of sufficient temperature to desorb water from the molecular sieve. Generally, the regenerant passes through the steam heater 504 and the superheater 508 through a line 488 and the valve 482 to the top of the drier 456. Subsequently, the regenerant may pass through the drier 456, through the valve 484, and a line 498 before being cooled with, e.g., a cooling water exchanger, and routed to the isomerized product in the line 190 as depicted in FIG. 1. Typically, the valves 462, 474, 476, and 562 are closed.

Afterwards, the regenerant can be slowly cooled by first turning off the superheater 508 while continually passing the regenerant through the drier 456. Thus, the drier 456 and associated equipment can be cooled to slowly ramp down the temperatures. At the end of the regeneration process, the drier 456 generally contains the regenerant as a gas.

By using the gas rich in hydrogen, the used regenerant can be forced from the drier 456 through the opened valves 462, 464, and 550 with the valve 554 closed to a line 486. The gaseous used regenerant may pass through a flow indicator 494 and a restriction orifice 492. Generally, the restriction orifice 492 reduces the flow and also reduces the pressure of the regenerant recycled back to or upstream of the suction drum 430. Due to the pressure differential of the used regenerant across the restriction orifice 492, reducing the pressure to a desired level can prevent a "blow-out" of the suction drum 430. Also, it is typically desired to reduce the flow of the used regenerant to permit its dilution in the suction drum 430. Mixing the used regenerant with the incoming fluid in the line 410 can dilute the regenerant and reduce the impact on downstream operations, downstream equipment, and/or downstream vessels 160, such as those vessels comprised in the reaction zone 170 and the fractionation zone 180 as depicted in FIG. 1. Although a flow indicator 494 and a restriction orifice 492 have been disclosed, it should be understood that other types of fluid tapering devices may be used, such as a flow indicating controller communicating with a flow control valve or one or more other type devices. Generally, the presence of the fluid tapering device 490, such as the restriction orifice 492, can reduce the amount of gas sent back to the suction drum 430 than otherwise would occur in its absence.

By selecting the restriction orifice size, the length of recycle can be designed to sufficiently dilute the used regenerant in the suction drum 430 before being passed through at least one of the driers 454 and then to the reaction zone 170 as depicted in FIG. 1. By reducing the flow and pressure of the used regenerant back to the suction drum 430, the used regenerant can be diluted with other gases entering the suction drum 430 through the line 410. Thus the impact on the one or more downstream operations, downstream equipment and/or downstream vessels 160, as depicted in FIG. 1, may be minimized.

An alternative embodiment can prevent the condensation and absorption of the regenerant on the molecular sieve to expedite removal of the used regenerant from the regenerated drier by lowering the pressure of the gas rich in hydrogen entering the drier 456. In this exemplary embodiment, the drier 456 generally contains the used regenerant as a gas at the end of the regeneration process. Using the gas rich in hydrogen, the gas rich in hydrogen can pass through the open valve 476 with the valve 474 closed. The gas rich in hydrogen can pass into a line 564, and through the fluid tapering device 590 including a flow indicator 594 and a restriction orifice 592 to reduce the pressure of the gas. Afterwards, the gas can pass through the open valve 562 and into the drier 456. The regenerant can be forced from the drier 456 through the opened valves 462 and 464. Next, the valve 554 can be opened and the valve 550 can be closed so the regenerant may bypass the fluid tapering device 490 via a line 558 and enter the line 486. Subsequently, the regenerant may pass upstream or to the suction drum or receiver 430, as described above. Thus, the fluid tapering device 590 may indirectly regulate the flow and reduce the pressure of the used regenerant, and keep the pressure inside the drier 456 below the saturation pressure of the used regenerant.

As discussed above, the drier 458 may be operated at the first condition and the other drier 456 may be operated at the second condition. It should be understood that additional lines and/or valves can be provided to operate the drier 456 at the first condition, the drier 458 at the second condition, and both driers in series. As an example, the driers 456 and 458 can be placed back in series operation with, e.g., the drier 456 in a lag position with respect to the drier 458, after regeneration.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth uncorrected in degrees Celsius and, all parts and percentages are by mole, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for regenerating at least one drier for an apparatus for isomerizing a hydrocarbon stream rich in at least one hydrocarbon selected from the group consisting of at least one C4 hydrocarbon, at least one C5 hydrocarbon, at least one C6 hydrocarbon, and mixtures thereof, comprising:

A) regenerating the at least one drier with a regenerant wherein the at least one drier contains a used regenerant; and
   B) recycling the used regenerant upstream of the at least one drier to mix over a period of time sufficient to dilute the used regenerant with a fluid comprising a gas rich in hydrogen to be dried to minimize upsets in one or more downstream operations.

2. The process according to claim 1, wherein the fluid comprises a liquid rich in at least one hydrocarbon selected from the group consisting of at least one C4 hydrocarbon, at least one C5 hydrocarbon, at least one C6 hydrocarbon, and mixtures thereof.

3. The process according to claim 1, wherein the period of time is calculated to dilute the used regenerant with the fluid comprising at least one reactant to minimize upsets in at least one of a downstream reaction zone and a fractionation zone.

4. The process according to claim 1, wherein the at least one drier is a liquid feed drier and the used regenerant is recycled upflow through the at least one liquid feed drier.

5. The process according to claim 4, wherein the at least one drier is a liquid feed drier and the used regenerant is recycled downflow through the at least one liquid feed drier.

6. The process according to claim 5, wherein the at least one drier is a gas drier.

* * * * *